United States Patent [19]

Bogatzki et al.

[11] Patent Number: 4,852,415
[45] Date of Patent: Aug. 1, 1989

[54] INSPECTION MACHINE FOR PLASTIC BOTTLES

[75] Inventors: Hans-Ulrich Bogatzki, Zürich; Felix Kramer, Friedlisberg, both of Switzerland

[73] Assignee: Elpatronic AG, Zug, Switzerland

[21] Appl. No.: 182,790

[22] Filed: Apr. 18, 1988

[30] Foreign Application Priority Data

May 12, 1987 [CH] Switzerland ............... 01841/87

[51] Int. Cl.⁴ .................. G01B 11/00; G01B 11/02; G01M 3/32; G01D 21/02
[52] U.S. Cl. .................. 73/865.8; 73/49.2; 250/223 B; 356/428
[58] Field of Search .......... 73/865.8, 865.9, 49.2, 73/49.3, 52, 49.2 R; 250/223 B; 356/428; 209/523, 524, 525, 528

[56] References Cited

U.S. PATENT DOCUMENTS

| | | | |
|---|---|---|---|
| 2,331,277 | 10/1943 | Stout | 250/223 B X |
| 3,010,310 | 11/1961 | Rowe | 73/45 |
| 3,384,235 | 5/1968 | Schulze et al. | 209/525 |
| 3,462,015 | 8/1969 | Tysver et al. | 73/52 X |
| 3,601,616 | 8/1971 | Katsumota et al. | 356/428 X |
| 3,916,694 | 11/1975 | Loos et al. | 73/865.8 |
| 3,918,570 | 11/1975 | Dunham et al. | 250/223 B X |
| 3,957,154 | 5/1976 | Shiba | 250/223 B X |
| 4,019,370 | 4/1977 | Allocco, Jr. | 73/49.2 R X |
| 4,124,112 | 11/1978 | Mohney et al. | 250/223 B X |
| 4,145,916 | 3/1979 | Butt et al. | 73/49.3 |
| 4,146,134 | 3/1979 | Keen et al. | 250/223 B X |
| 4,184,362 | 1/1980 | Standly et al. | 73/45.1 X |
| 4,188,818 | 2/1980 | Garrison | 73/49.3 |
| 4,378,493 | 3/1983 | Dort et al. | 250/223 B |
| 4,580,045 | 4/1986 | Kulig | 250/223 B |

FOREIGN PATENT DOCUMENTS 2620046 11/1977 Fed. Rep. of Germany .
3036502 5/1982 Fed. Rep. of Germany .
1194835 11/1985 U.S.S.R. .............. 73/865.9

Primary Examiner—Tom Noland
Attorney, Agent, or Firm—McCormick, Paulding & Huber

[57] ABSTRACT

An inspection machine for plastic bottles has a turn table rotatable about a vertical axis, and a plurality of inspection stations to receive the bottles to be inspected. Output signals from sensors are fed to evaluation electronics provided on the turntable itself. Each station has a plate on which a bottle can be rotated as a result of rotation of the turntable. During inspection each bottle executes an orbital movement about the vertical axis of the turntable and at the same time a rotation about the axis of bottle itself as a result of which each bottle is inspected more than once for perpendicularity of the bottom of the bottle and its neck as well. Volume and pressure tightness as well as height of the bottle and bottle color are also inspected.

8 Claims, 5 Drawing Sheets

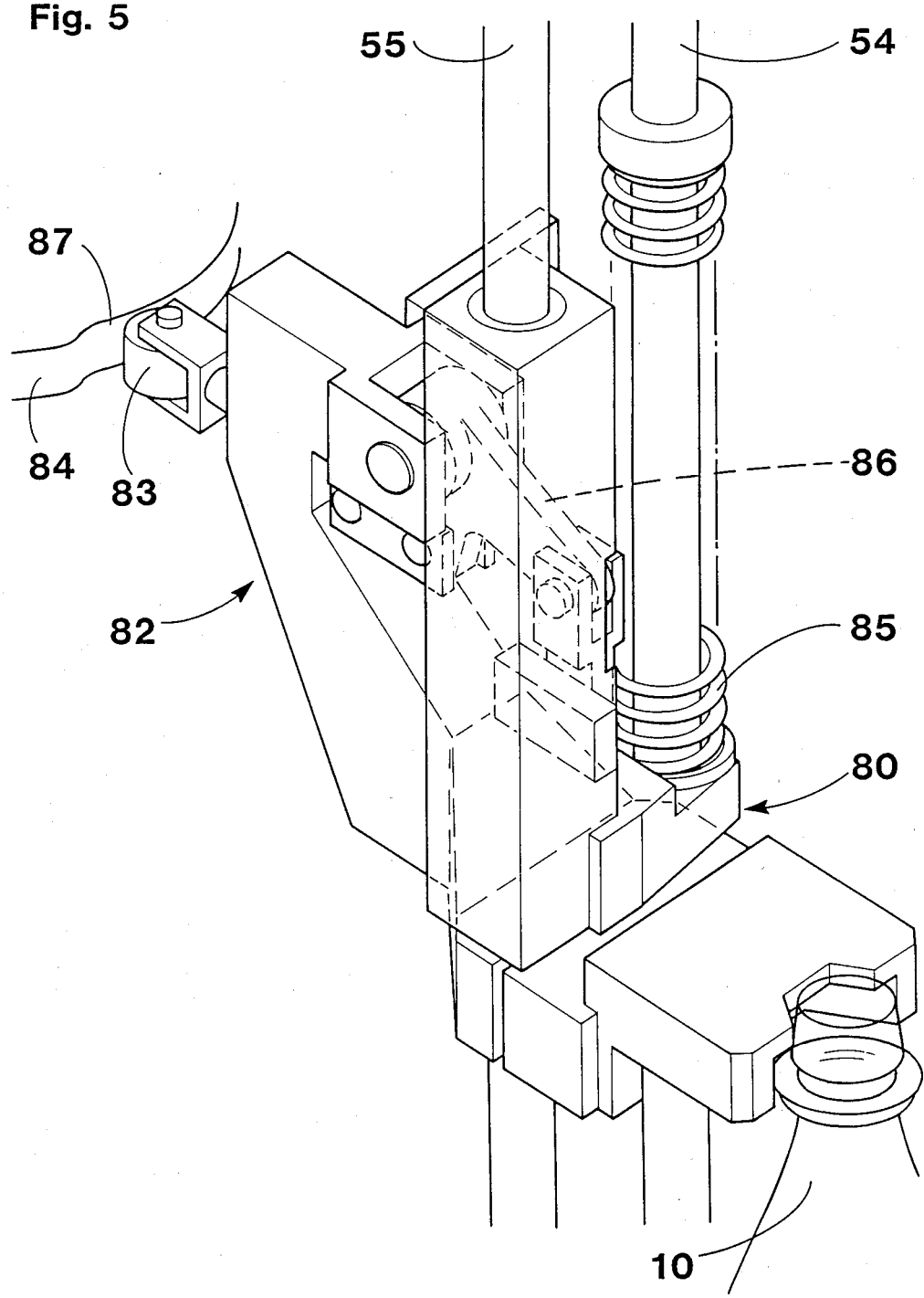

INSPECTION MACHINE FOR PLASTIC BOTTLES

BACKGROUND OF THE INVENTION

The invention relates to an inspection machine for plastic bottles, having a turn-table which is rotatable about a vertical axis and has a plurality of stations to receive the bottles to be inspected, having sensor devices each consisting of a sensor and a mark to be scanned by this and for producing corresponding output signals, and having evaluation electronics for processing the output signals.

The above-mentioned inspection machine is intended primarily for the inspection of returned bottles of plastic material, that is to say of bottles which are returned by the customer and then refilled, which may happen about twenty-five times per bottle. What is in mind are beverage bottles in particular.

It is true that at present the returnable bottle of glass is making a come-back for reasons of protection of the environment but their weight and their fragility are the reason why leading beverage manufacturers are directing their attention to a returnable bottle of lower weight. A bottle of polyethyelene terephthalate or PET is suitable for this. A PET bottle off considerable weight advantages. A full 1.5-liter PET bottle actually weighs no more than its 1-liter counterpart of glass. Thus the housewife carries home 50% more contents with the same physical effort and delivery vehicles pollute the environment less and use less fuel. These are only some of the welcome advantages of PET bottles or of plastic bottles in general.

Before being refilled, plastic bottles must be checked for a number of parameters for which there is no necessity at all in the case of glass bottles. Thus in the case of a plastic bottle, it is necessary to check, before the refilling, whether its bottom, neck and mouth are still at right angles to the bottle axis. Plastic bottles are actually permanently deformable under the action of heat and such deformed bottles cannot then be filled satisfactorily or not without difficulty. For the same reason, the bottle height and the volume of the bottle may vary in the course of time in the case of plastic bottles so that the prescribed amount of filling can no longer be introduced into the bottle.

In addition, however, there are also parameters which have to be checked in plastic bottles as in glass bottles. These parameters include a code which has to be read (for example for sorting purposes) and the pressure-tightness of the bottle. The last-mentioned parameter may be worth checking in glass bottles because of damage to the mouth, through cracks in the wall etc and in the case of plastic bottles there is the additional necessity of checking the pressure-tightness because holes can easily be caused in plastic bottles (for example by pointed objects, glowing cigarettes etc), which in some circumstances may soarcely be visible to the eye.

It is true that inspection devices of the most varied types, even for plastic containers, belong to the prior art, but hitherto no inspection machine has become known which is in a position to carry out all the above-mentioned parameter checks with tolerable expenditure of costs and time.

A method of adjustment and an apparatus for detecting faults in a hollow body of transparent material are known from DE-OS No. 2620046, wherein glass and plastic material are considered as materials and for example cracks, holes, deviations from the specified size, such as inclination of the mouth, ovality and faulty length of the hollow body, as faults to be detected. Obviously, however, these faults can only be detected alternatively in the known fault detection apparatus. The known method and the known apparatus serve more the purpose of simplifying, shortening and making more reliable the adjustment of the evaluation electronics even with a plurality of checking channels, of achieving a partial automation of this adjustment, of taking into account the requirement of greater sensitivity of the fault recognition and of ensuring a supply of operating voltage free of disturbance even with greater sensitivity of fault detection. Even if the known apparatus should comprise a plurality of checking channels, plastic bottles to be refilled could not be checked with it between a bottle washing plant and a filling plant, with a tolerable expenditure of time, because, in the known apparatus, the hollow bodies to be checked have to be brought successively into a checking position, be held and checked in this and only then be conveyed further For reasons of time, this could not be reconciled with the above-mentioned application in which 600 plastic bottles per minute would have to be checked Apart from this, the known apparatus works only with optical checking devices which are likewise unsuitable for the above-mentioned application because bottles which are to be refilled frequently carry with them residues of labels or whole labels from the washing plant, which would make any optical examination with the exception of checking the presence of such foreign bodies, ineffective.

An apparatus for inspecting transparent containers for foreign bodies is known from DE-OS No. 3036502, wherein it is true that the expenditure of time for the inspection is less than in the above-mentioned known apparatus, because the containers are conveyed on a conveyor track past an illuminating device and a scanning device disposed opposite this, but the scanning device works with opto-electronic, light-sensitive elements which leads to the same disadvantages as in the above-mentioned known apparatus. The main purpose of the apparatus for the inspection of transparent containers is therefore also a reliable identification of impurities or foreign bodies such as residues of labels adhering to the container walls. For the said reasons, this known apparatus would, at most be suitable for reading the code but not for checking parameters such as perpendicularity of bottom, neck and mouth, bottle height, volume and soundness.

An apparatus for testing glass bottles is known from U.S. Pat. No. 3,010,310 wherein it is true that the expenditure of time can be reduced because the glass bottles are introduced, by means of a star wheel to which they are fed by a conveyor worm, into a rotating turn-table from which they are removed again, at the end of the test, by a further star wheel, but this known apparatus is adapted only for carrying out one test, namely a bursting test in which the glass bottles are acted upon internally with pneumatic pressure in order to establish whether they meet minimum strength requirements. This known apparatus is neither suitable nor is it provided for the mass checking of plastic bottles for a number of other parameters.

It is the object of the invention to develop an inspection machine of the type mentioned at the beginning so that such different test parameters as perpendicularity of the bottom as well as perpendicularity of neck and mouth of the bottle to the bottle axis, volume and pressure-tightness, bottle height and bottle code can be checked on one and the same machine with tolerable expenditure of time and costs.

SUMMARY OF THE INVENTION

In the inspection machine according to the invention, the expenditure on time and costs is reduced considerably as a result of the fact that each plastic bottle is not only received in a turn-table but during its movement with the turn-table is also turned about the axis of the bottle that is to say is moved past sensors or the marks associated with these, all of which ar secured to the turn-table and rotate with this. The saving in time is quite considerable because the sensors or the marks to be scanned by these move with the bottles to be checked. From the moment when the bottle enters the turn-table to the moment when the bottle leaves the turn-table, there is sufficient time, even with a relatively high speed of rotation of the turn-table, to carry out all checks and to carry out repeatedly many checks which are frequently adversely affected by disturbing influences, in order to be able to carry out an acceptable checking operation with certainty. The expenditure on costs is lower in the inspection machine according to the invention as a result of the fact that the whole of the evaluation electronics is on the turn-table and rotates with this. Freely programmable electronic control devices, which are necessary for the individual tests, are already so cheaply on the market that the whole control of the checking operations can also be effected on the turn-table itself. The turn-table therefore only needs a supply of operating voltage (for example through slip rings) and a data transmission device from the rotating turn-table to the stationary part of the machine, which can likewise be effected through slip rings by the multiplex method for example. The internal construction of the control and evaluation electronics, their current supply and their connection to data display devices, printers and the like are not subjects of the invention.

The subjects of the invention are rather the turn-table and the checking possibilities which result from the fact that all the parts essential for the checking rotate with the turn-table during the checking.

In further accordance with the present invention the bottom and perpendicularity of neck and mouth of the bottle to the bottle axis can be checked in a simple manner because, if perpendicularity is no longer present, the bottle will execute a wobbling movement at the bottom and/or top during rotation about its axis and this leads to an output signal which will cause the bottle to be discarded as faulty. As in all other checking operations, the turn-table offers the advantage that, as a result of its rotation, further movements necessary for the checking can be produced without special additional driving devices being necessary for the purpose. For example, a rotation of the plate on which the bottle stands can be derived from the rotation of the turn-table (by engagement of two gear-wheels), or a nonrotatable plate may be used on which the bottle itself is set in rotation in that during the rotation of the turn-table, it is moved past a resilient pressure pad for example, on which the bottle rolls and rotates as a result.

In the development of the invention according to claim 4, a device controlled by the rotation of the turn-table is again provided, by means of which pressure is applied to the interior of the bottle for detecting the parameter volume and pressure-tightness. If a specific pressure value is not reached, the bottle must be perforated or have increased in volume and if the specific pressure value is exceeded, the bottle must have been compressed, that is to say it no longer has its nominal volume. In both cases, the bottle would be discarded as defective.

The development of the invention according to claim 5 shows an appropriate possibility of acting upon the interior of the bottle with pressure by means of a piston which can be actuated via its piston rod by a camplate provided on the turn-table in order to force a certain amount of air into the bottle.

Only in the developments of the invention according to claims 6 and 7 are parameters detected by using light sensors. In the development according to claim 6, however, it may also be appropriate to use a magnetic or the like sensor device for example, to detect the parameter "bottle height". Only in the development according to claim 6 does the sensor not move with the turn-table. Instead, the mark to be detected by the sensor moves, which mark may have any form suitable for detection (for example a body, a color marking or the like).

In the development of the invention according to claim 7, the marks are provided as code marks on the bottle itself and the bottle rotating about its axis moves the code marks past the sensor.

In the development of the invention according to claim 8, a source of error which has frequently impaired the checking operation in the prior art, namely drops of water, residues of labels or the like present in the region of the marks to be scanned, is eliminated by blowing air onto the bottle in the region of the bottle code.

One example of embodiment of the invention is described in more detail below with reference to the drawings.

BRIEF DESCRIPTION OF THE DRAWINGS

FIG. 5 shows, in an individual illustration, the method of deriving the vertical movement of a carriage carrying the head shown in FIG. 4, from the rotary movement of the turn-table.

DETAILED DESCRIPTION

Figure 1:
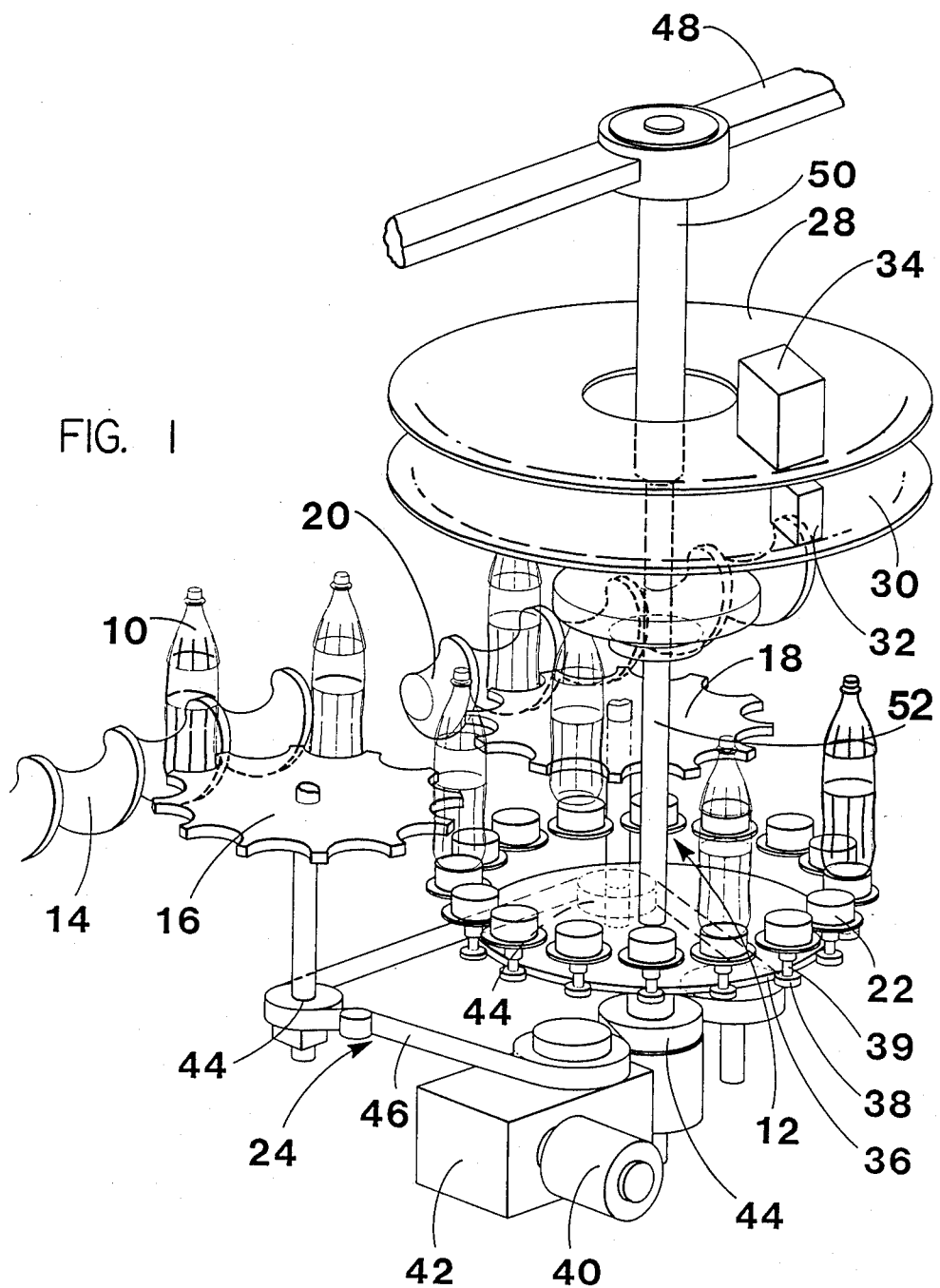
FIG. 1 shows an inspection machine according to the invention for plastic bottles, of which only the parts essential for conveying the bottles through the machine and for rotating the bottles about their own axes are illustrated.

FIG. 1 shows an example of embodiment of an inspection machines for bottles 10 of plastic material, particularly of PET. In FIG. 1, only the essential conveyor devices are illustrated by means of which the bottles 10 are fed to a rotatable turn-table 12 and removed again after checking has been effected. The conveyor devices include a feed conveyor worm 14, a feed star wheel 16, a delivery star wheel 18 and a delivery conveyor worm 20. The feed star wheel 16 transfers the bottles 10 to plates 22 of the turn-table 12 on which the bottles are conveyed as far as the delivery star wheel 18. Below the conveyor worms 14 and 20 there are (not shown) conveyor tracks on which the bottles are pushed forwards by the conveyor worms rotating about their longitudinal axes. Boundaries, likewise not illustrated, by means of which the bottles are held in the turns of the threads of the conveyor worms are provided in the longitudinal direction, beside the conveyor worms. The conveyor worms 14,20, the star wheels 16,18 and the turn-table 12 are set in rotation via a common chain drive 24 so that they move precisely in synchronism. This is important because a bottle recognized as faulty during the checking is discarded at a specific point on or after the delivery conveyor worm 20 by an ejector which, on actuation, exerts a burst of compressed air on the bottle in question, for example, in order to remove it from the line of other bottles. The synchronous correlation of the movements of the circumferential depressions in the star wheels 16,18, of the conveyor worms 14,20 and of the plates 22 of the turn-table 12 ensures that the bottle to be ejected is precisely in front of the ejector at a specific moment.

Figure 2:
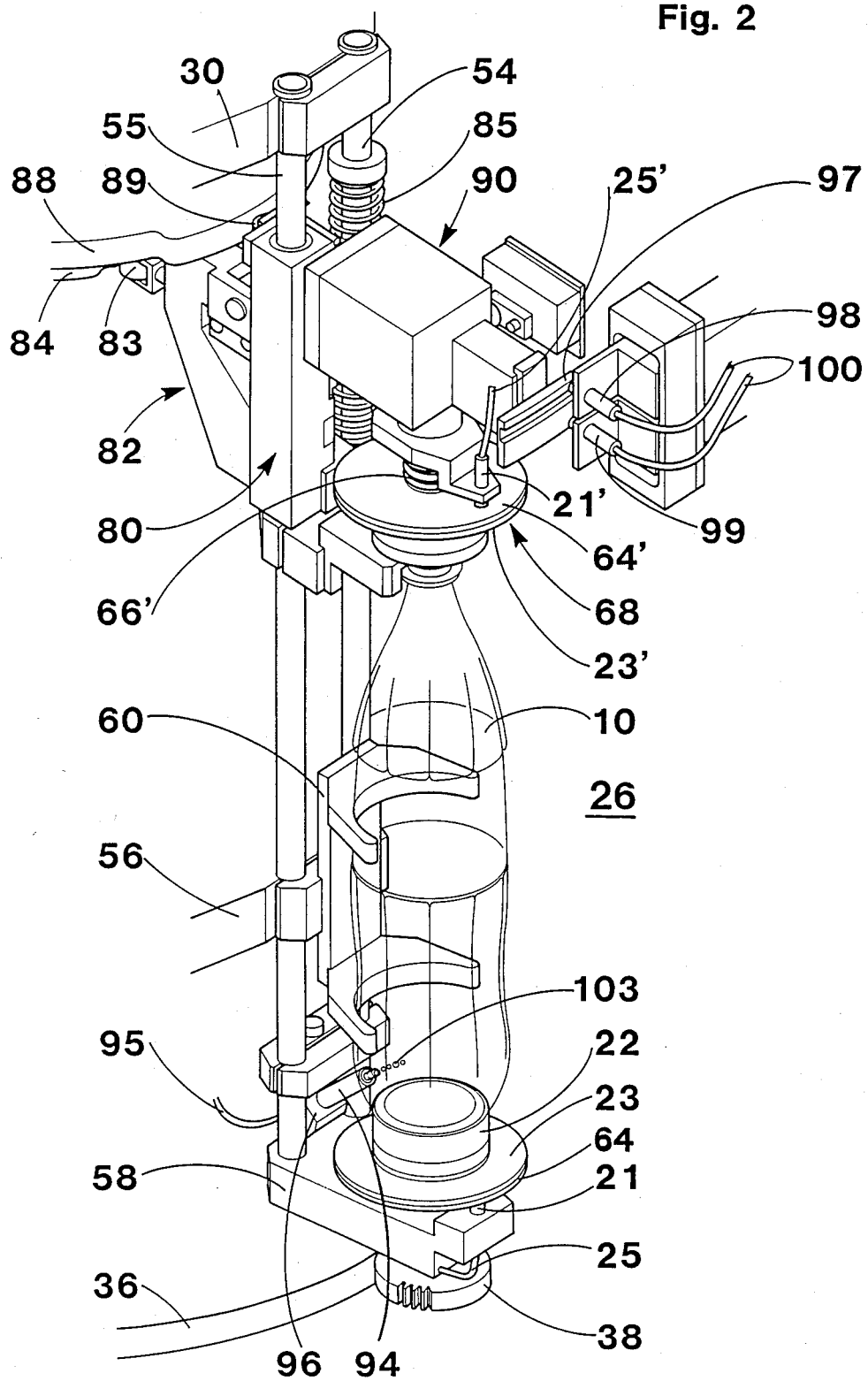
FIG. 2 shows one of sixteen stations of the turn-table of the inspection machine according to FIG. 1.

The turn-table 12 illustrated in FIG. 1 comprises sixteen stations 26 (FIG. 2) to receive the bottles 10 to be inspected. Of the stations 26, only the plate 22 and its drive device to be described in more detail below are shown in FIG. 1 whereas a complete station is illustrated as a detail in FIG. 2. FIG. 1 shows two upper supporting plates 28,30 which are part of a turn-table frame which is not illustrated. The upper end of each station 26 is secured to the lower supporting plate 30 as is shown in FIG. 2 and described in more detail below. Thus, when the turn-table 12 is set in rotation by the chain drive 24, the supporting plates 28 and 30 also rotate. Secured between the supporting plates 28 and 30 are control electronics 32 which rotate with these and are only illustrated schematically for one station 26. Secured to the supporting plate 28 are evaluation electronics 34 which rotate with this and are likewise illustrated only schematically for one station 26. The control electronics 32 are freely programmable electronics which control the individual checking operations. The electric operating voltage is applied to the turn-table 12 through a slip-ring arrangement disposed underneath and not illustrated. The evaluation electronics 34 are connected to stationary data processing devices (display devices, printers or the like) through a corresponding slip-ring arrangement or the like at the upper end of the turn-table.

Disposed immediately below the turn-table 12 is a stationary sun wheel 36, with the teeth of which, planet wheels 38 are in engagement. Each planet wheel 38 is connected to a plate 22 by a shaft 39 so that, on rotation of the turn-table 12, the planet wheels 38 rotating with this are set in rotation and in turn set the plates 22 in rotation. The drive motion of the turn-table 12 is produced by an electric motor 40 through a gear unit 42 which drives the chain drive 24. This drive motion is transmitted to the star wheels 16,18 and the turn-table 12 by chain wheels 44 round which a common chain 46 is passed. The stationary frame of the inspection machine is merely indicated by a cross member 48 and a central column 50. At its upper end, the shaft 52 is mounted for rotation in the central column 50. At its lower end, the shaft 52 carries one of the said chain wheels 44.

Figure 3:
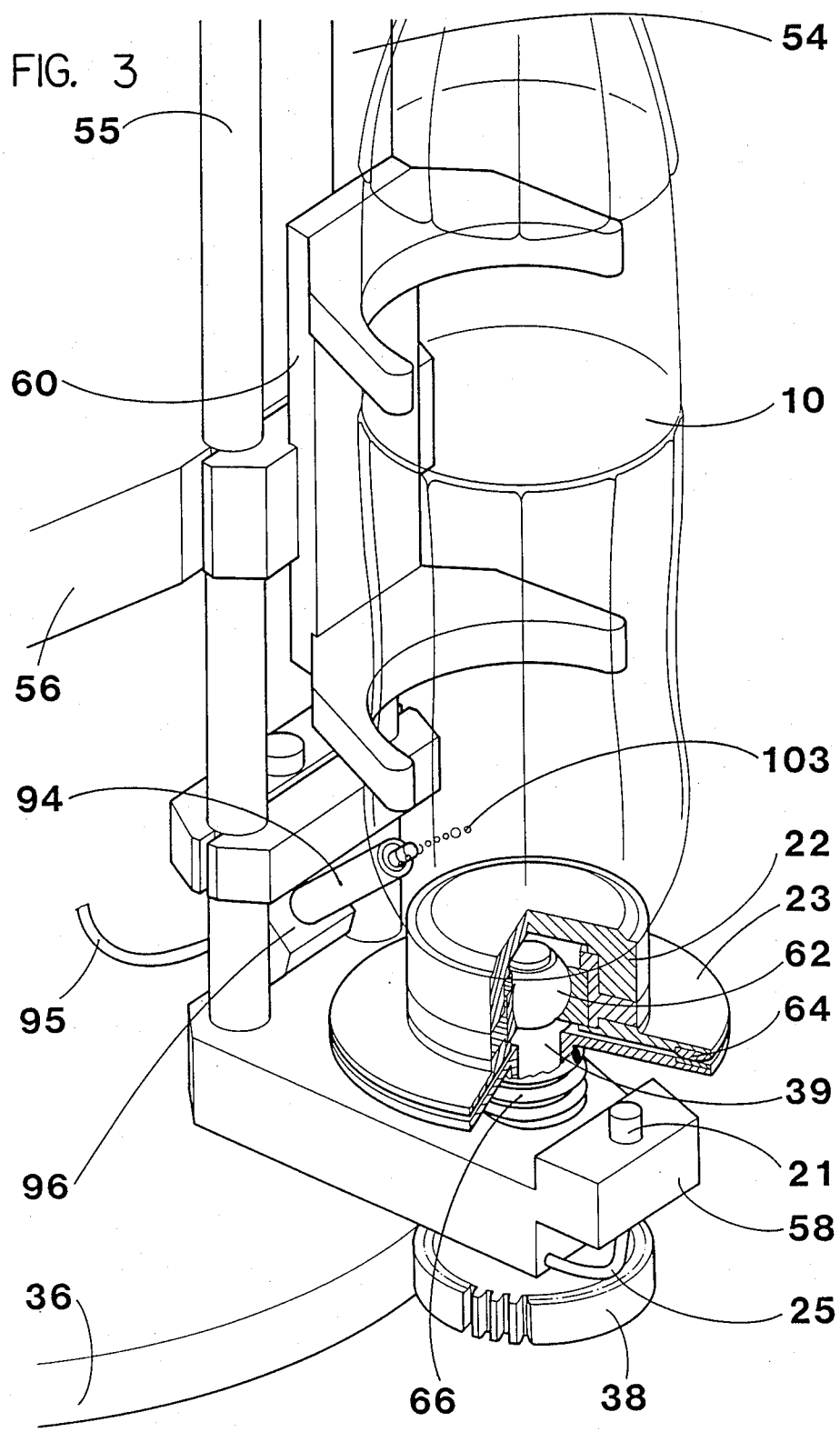
FIG. 3 shows as a detail, illustrated partially in section, a plate with associated sensor device for determining the perpendicularity of the bottom of the bottle to the bottle axis.

With reference to FIGS. 2 and 3, the construction of the stations 26 will now be described in more detail and, since they all have the same construction, only one station will be described. The station 26 comprises two vertical supporting columns 54,55 which are secured, at their upper end, to the supporting plate 30. Furthermore, the supporting columns 54,55 are secured, in their lower region, to a supporting plate 56 fixed to the turn-table. Secured to the lower end of the supporting columns 54,55 is a horizontal bracket 58 which carries the plate 22 and its drive device in the form of the planet wheel 38 which is in engagement with the sun wheel 36. Also secured to the supporting plate 56 is a fork head 60 with two forks which embrace the bottle 10.

At its upper end, the shaft 39 of the planet wheel 38 carries a ball-and-socket joint 62 which is so constructed that the plate 22 rotates jointly with the planet wheel 38 but is pivotally movable to all sides. Provided between the plate 22, to which a broad flange 23 is secured, and the bracket 58 is a flange 64 which is adapted for displacement on the shaft 39 and is urged against the underside of the flange 23 by a spring 66. The spring 66 is supported, by its lower end, on the bracket 58.

Figure 4:
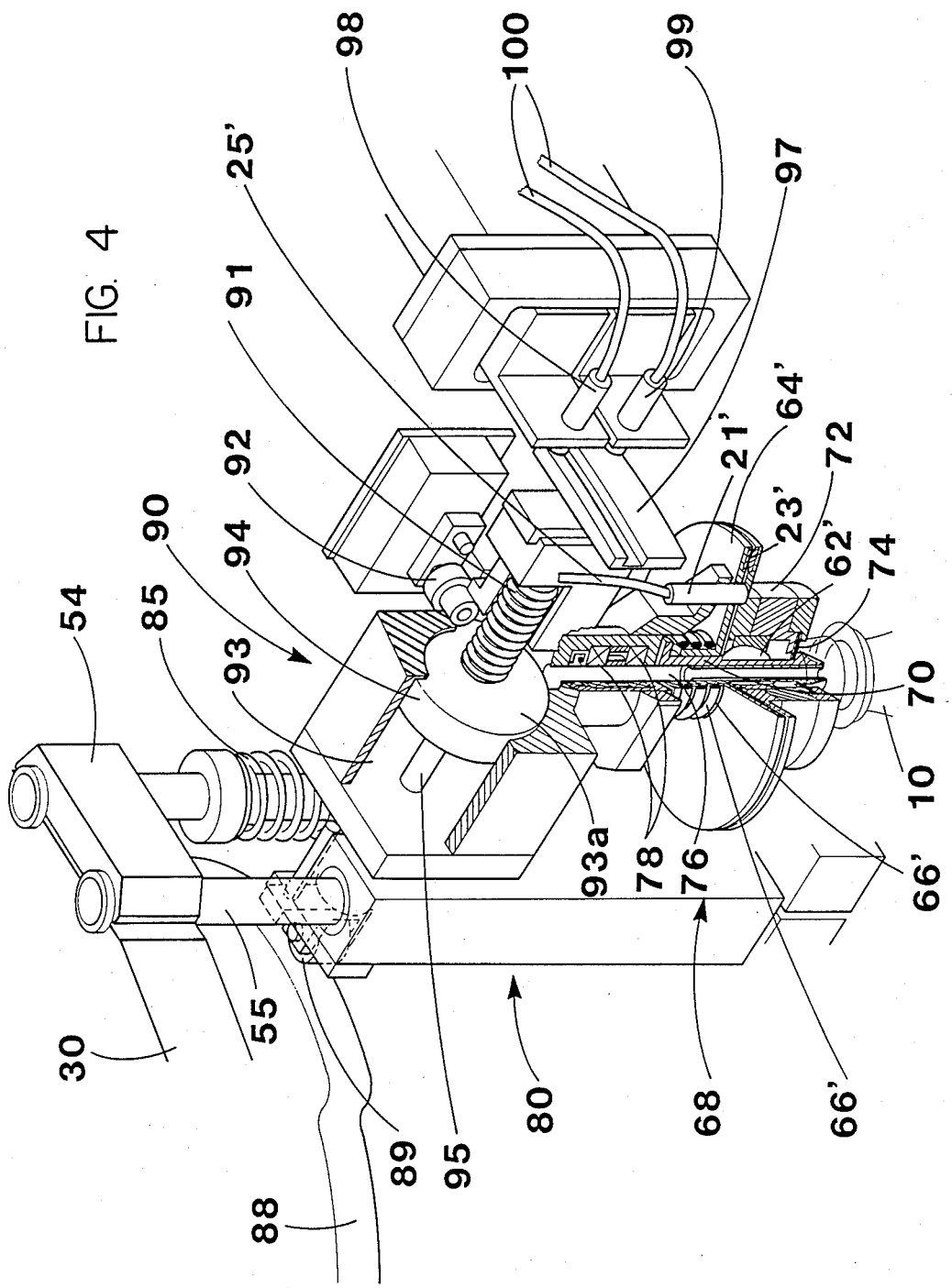
FIG. 4 shows as a detail, illustrated partially in section, a head and sensor devices which can be lowered onto the bottle to determine the perpendicularity of neck and mouth to the bottle axis, volume and soundness as well as bottle height.

According to FIG. 4, a head 68, which is displaceable along the supporting columns to engage the mouth of the bottle 10, is provided on the supporting columns 54,55 opposite the plate 22. The head 68 has substantially the same previously described construction as the plate 22, that is to say it comprises a flange 23' which is provided opposite the plate 22 and is movable to all sides on a ball-and-socket joint 62' and against which a flange 64', which is adapted for displacement on a shaft 70 of the head, is pressed from above by means of a spring 66'. Correspondingly to the plate 22, the head 68 comprises a head member 72 which comprises a seal 74 which is disposed in an annular depression and by means of which the head member 72 can be pressed tightly against the bottle mouth. The whole head 68 is mounted on a hollow shaft 76 for rotation by means of rolling bearings 78. The hollow shaft 76 is secured to a carriage 80 which is adapted for displacement on the vertical supporting columns 54,55. Provided radially inwards from the carriage 80 is a cranked lever device 82 which, through a tracing roller 83, senses a camplate 84 secured to the machine frame and converts a radial movement of the tracing roller, produced in the course of this, into a vertical movement of the carriage 80 against the force of a helical spring 85, which should easily be clear from the illustration in FIG. 5. When a raised portion comes on the camplate 84, the tracing roller 83 in FIG. 5 is urged radially towards the right as a result of which a bell-crank lever 86 moves upwards and at the same time entrains the carriage 80 against the force of the spring 85. Then, when a valley 87 comes on the camplate 84 (such a valley 87 is associated with each station 26), the carriage 80 moves downwards and urges the head 68 onto the mouth of the bottle. A proximity sensor 21 is associated with the plate 22. A proximity sensor 21' is correspondingly associated with the head 68. The proximity sensors 21 and 21' are fixed to the turn-table and thus do not participate in the rotary movement of the bottle 10, gripped between the plate 22 and the head 68, about the bottle axis during the rotary movement of the turn-table. If bottom, neck and/or mouth of the bottle 10 gripped between plate and head should not be at right angles to the bottle axis, the flange 23 and/or the flange 23' would execute a wobbling motion during the rotation of the bottle because of the ball-and-socket joint 62 or 62' respectively and as a result would displace the flange 64 or 64' axially and as a result bring this more or less close to the proximity sensor 21 or 21'. This approach is then detected and evaluated in the evaluation electronics 34 to which the proximity sensors 21,21' are connected, and this will be gone into in more detail below.

The carriage 80 also carries a device 90 by means of which, again controlled by the rotation of the turn-table, pressure can be applied to the interior of the bottle 10, through the head 68, which pressure can be determined by a pressure sensor 92 secured to the head. The device for exerting pressure 90 comprises a radially displaceable piston 94 which is disposed in a cylinder 93 and the piston rod 95 of which can be displaced radially, by a camplate 88 secured to the machine frame (see FIGS. 2 and 4), via a tracing roller 89, against the pressure of a return spring 91. At the side of the piston 94 adjacent to the return spring 91 there is a cylinder compartment 93a which is in communication, on the one hand with the pressure sensor 92 and on the other hand, through the hollow shaft 76 and the shaft 70 which is likewise hollow in construction, with the interior of the bottle. When the tracing roller 89 is urged radially outwards on the camplate 88 by a raised portion, the amount of air present in the cylinder compartment 93a is forced into the bottle 10 by the piston 94 moving towards the right in FIG. 4. The method of evaluating this checking operation is explained further down.

According to the illustration in FIGS. 2 and 3, an opto-electrical sensor 94 is associated with the station 26 and serves to detect a bottle code marking 103 in the form of raised dots or lines. It may be a question of an ordinary commercial sensor which, by means of optical fibres, throws a beam of light emitted by a light source (for example a light-emitting diode) onto the bottle and transmits a beam of light reflected by the code marking 103 back to a photoelectric receiver The sensor 94 is connected to the evaluation electronics 34 through a line 95.

Each station is further provided with an air nozzle 96 which is illustrated symbolically in FIGS. 2 and 3 simply as an air outlet disposed beside the sensor 94. The air nozzle 96 directs a jet of compressed air onto a region through which the code marking 103 passes on rotation of the bottle 10. The jet of compressed air removes drops of water, which might have an adverse effect on the checking operation, from the surface of the bottle.

The term "sensor device" used in the specification and in the patent claims includes a sensor and a mark to be sensed by this in each case. All the sensors described above each rotate with the turn-table 12 and, in the course of this, sense the "mark" moving past them. In the case of the sensors 21,21', the latter is the axially displaceable flange 64 or 64'. Finally, however, the inspection machine also comprises a further sensor device wherein the sensor is mounted fixed to the machine frame and the mark rotates with the turn-table 12. This further sensor device serves to detect the height of the bottle. A formation in the form of a steel piece 97 is secured to the carriage 80 as a mark. Each station comprises such a steel piece 97. On the other hand, a common stationary sensor 98 which, according to the illustration in FIG. 4, is secured to the machine frame by means of an angle member, is associated with all the steel pieces. The sensor 98 may be a magnetic or an optical sensor. In the latter case, the formation 97 could also simply be a reflecting marking, a light/dark marking, a colored marking or the like. A further sensor 99 illustrated in FIG. 4, which has the same construction as the sensor 98, serves as a minimum sensor which only responds if the head 80 is lowered too far either because there is no bottle 10 in the station 26 or too low a bottle. The sensors 98 or 99 are connected to the evaluation electronics 34 through lines 100. The sensors 21 and 21' are connected to the evaluation electronics 34 through lines 25 and 25' (see FIGS. 2-4).

The above description should easily show how the parameters of plastic bottles mentioned at the beginning can be detected on the inspection machine according to the invention, namely as follows:

The sensor devices 21,64 and 21', 64' respectively serve to detect the parameter "perpendicularity of the bottom of the bottle to the bottle axis" and the parameter "perpendicularity of neck and mouth of the bottle to the bottle axis". If the bottle 10 is not perpendicular, it executes a wobbling movement during rotation about its axis, which movement likewise sets the flange 23 and/or 23' in a wobbling movement which is detected by the proximity sensor 21 or 21' through the flange 64 or 64' which is then displaced axially. The evaluation electronics 34 compare the flange displacement caused by the wobbling motion with a limiting value and, if this is exceeded, then later actuate the ejector when the bottle in question is moving past it.

In order to detect the parameter "volume and pressure-tightness of the bottle", the pressure which builds up when the volume of air is forced out of the cylinder compartment 93a into the interior of the bottle is detected by the pressure sensor 92. The evaluation electronics 34 compare the value of the back pressure with a boundary value again and, in the event of too great a deviation from this limiting value, later actuate the ejector. An airtight bottle with a specific volume has a specific boundary value of the back pressure. If the bottle should have a hole, the boundary value is not reached when the said volume of air is forced in. If the bottle should have been permanently deformed in use, its volume will be smaller than the original nominal value. Accordingly, when the said volume of air is forced in, the boundary value of the back pressure will be exceeded.

In order to detect the parameter "height of bottle", the vertical position of the formation 97 of all the stations 26 is detected by the common sensor 98 as already explained.

Finally, in order to detect the parameter "bottle code", the bottle code marking 103 which is present in the form of raised dots or lines on the surface of the bottle, is detected optically. The detection of this parameter enables bottles to be sorted, bottles of other manufacturers to be sorted out, bottles which have already reached a certain age to be eliminated etc.

During the inspection or checking operations described above, it is important that the relative speed between sensor and associated mark should not be too high during the detection operation and that adequate time should be available for carrying out a detection operation one or more times. These criteria are fulfilled in an optimum manner in the inspection machine described above because, with the exception of the detection of the parameter "height of bottle", in all cases "rotating measurements" are carried out with a sensor which is stationary with respect to the mark to be detected. The turn-table 12 rotates and each bottle 10 rotates about its own axis, thus the test piece executes two rotary movements simultaneously, namely an orbital movement about the center axis of the turn-table and a rotary movement about the bottle axis. These two rotary movements are used for all the parameter detections with the exception of the detection of the parameter, height of bottle. Since there is a great deal of time available between the point at which the bottle 10 leaves the feed star wheel 16 and is received by a station 26 and the point at which this same bottle leaves this same station and is received by the delivery star wheel 18, each measurement can easily be carried out repeatedly. This is a further important advantage of the inspection machine described here, which is achieved as a result of the fact that the detection elements travel in a manner with the bottle 10 on the turn-table during the inspection. It is true that this does not apply to the measurement of the height of the bottle but in the form described here, this has the advantage that only one and the same sensor 98 is needed for all the stations. Particularly low expenditure on circuitry is achieved because the whole evaluation electronics 34 likewise move together with the turn-table 12.

During the detection of the perpendicularity of bottom, neck and mouth to the bottle axis, an accuracy of ±1° is achieved. In the measurement of volume and soundness, an accuracy of ±2% by volume is achieved. In the measurement of the bottle height, an accuracy of ±1 millimeter is achieved. These particulars relate to plastic bottles to be checked having a nominal content of 1 l or 1.5 l.

In a modified form of embodiment of the inspection machine described above, it is possible to use stationary plates (not illustrated) instead of the driven plates 22. In this case, the sun wheel 36 and the planet wheels 38 are not needed. Instead, a resilient pressure pad, on which the bottles 10 are rolled and so turned about the bottle axis, is provided externally round the turn-table at the height of the fork head 60. In addition, two rollers on which the bottle rolls during its rotary movement are additionally provided on the fork head 60. The rolling motion of the bottles is preferably effected slowly so that the appropriate checking operations can be carried out without being disturbed. A bottle moving slowly with respect to the sensor 94 during the checking operation will not allow any drops of water in the region of the sensor to be whirled about by the air, which would have an adverse effect on the reading operation.

We claim:

1. An inspection machine for plastic bottles, having a turn-table which is rotatable about a vertical axis and which has a plurality of stations to receive the bottles to be inspected, having sensor devices each consisting of a sensor and a mark to be sensed thereby and for producing corresponding output signals, and having evaluation electronics for processing the output signals, characterized in that (a) each station (26) comprises a plate (22) on which the bottle (10) is rotatable about a central longitudinal axis thereof, and (b) all the sensors (21, 21', 92, 94) and the evaluation electronics (34) are secured to the turn-table (12) and rotate jointly therewith.

2. An inspection machine according to claim 1, characterized in that the plate (22) is secured to a ball-and-socket joint (22) and that the bottle (10) can be gripped on the plate (22) by a head (68) which is secured to a vertically displaceable carriage (8) for free rotation on a further ball-and-socket joint (62').

3. An inspection machine according to claim 2, characterized in that, associated with each station (26) in order to detect the parameters "perpendicularity of the bottom and perpendicularity of the neck and mouth of the bottle to the bottle axis" are two sensor devices (21, 64, 21', 64'), each of which comprises a proximity sensor (21, 21') and that associated with each proximity sensor (21,21') as a mark is a flange (64, 64') which is movable along the bottom axis and is biased in the direction of one end of the bottle by a spring and which can be urged in the direction of the proximity sensor (21, 21') by reason of the plate (22) and the head (68) wobbling in the absence of perpendicularity.

4. An inspection machine according to claim 2, characterized in that, associated with each station (26) in order to detect the parameter "volume and pressure-tightness" is a device (90) by means of which, controlled by the rotation of the turn-table, pressure can be applied the interior of the bottle (10) through the head (68), which pressure which can be detected by a pressure sensor (92) disposed on the head (68).

5. An inspection machine according to claim 4, characterized in that the pressure applying device (90) comprises a piston (94) which is disposed in a cylinder (93) and a piston rod (95) of which can be actuated by a cam plate (88) secured to the machine frame as a result of which, a certain volume of air can be forced out of a cylinder compartment (93a), in front of the piston (94) and connected to the pressure sensor (92), into the bottle (10).

6. An inspection machine according to claim 2, characterized in that, in order to detect the parameter "height of bottle", each carriage (80) carries as a mark, a formation (97), the vertical position of which can be detected by a stationary sensor (98) common to all the stations (26).

7. An inspection machine according to claim 1, characterized in that, in order to detect the parameter "bottle code", each station (26) comprises a sensor device in the form of an optoelectrical sensor (94) to detect a bottle code marking (103) provided on the bottle (10).

8. An inspection machine according to claim 7, characterized in that each station (26) comprises an air nozzle (96) to blow on the bottle (10) in the region of the bottle code marking.

* * * * *